United States Patent [19]

Kamohara et al.

[11] Patent Number: 4,518,514
[45] Date of Patent: May 21, 1985

[54] HEAT STORAGE MATERIAL

[75] Inventors: Hideaki Kamohara, Ibaraki; Michio Yanadori, Hachioji; Seigo Miyamoto, Takahagi; Keiichi Koike, Matsudo, all of Japan

[73] Assignee: Hitachi, Ltd., Tokyo, Japan

[21] Appl. No.: 484,271

[22] Filed: Apr. 12, 1983

[30] Foreign Application Priority Data

Apr. 16, 1982 [JP] Japan ................................ 57-62406
Nov. 22, 1982 [JP] Japan ............................. 57-203614

[51] Int. Cl.$^3$ ............................................. C09K 5/00
[52] U.S. Cl. ..................................... 252/70; 562/607
[58] Field of Search ........................................ 252/70

[56] References Cited

U.S. PATENT DOCUMENTS 4,412,930  11/1983  Koike et al. ........................ 252/70

FOREIGN PATENT DOCUMENTS 53-14173   2/1978  Japan .
57-102982  6/1982  Japan .
149380     9/1982  Japan ................................... 252/70

Primary Examiner—Paul Lieberman
Assistant Examiner—Robert A. Wax
Attorney, Agent, or Firm—Antonelli, Terry & Wands

[57] ABSTRACT

A heat storage material to be used for air cooling systems is provided. This heat storage material comprises acetic acid or a mixture of acetic acid and one or more acetates and is further added with at least one anhydrous halide as nucleating agent to prevent supercooling.

11 Claims, 4 Drawing Figures

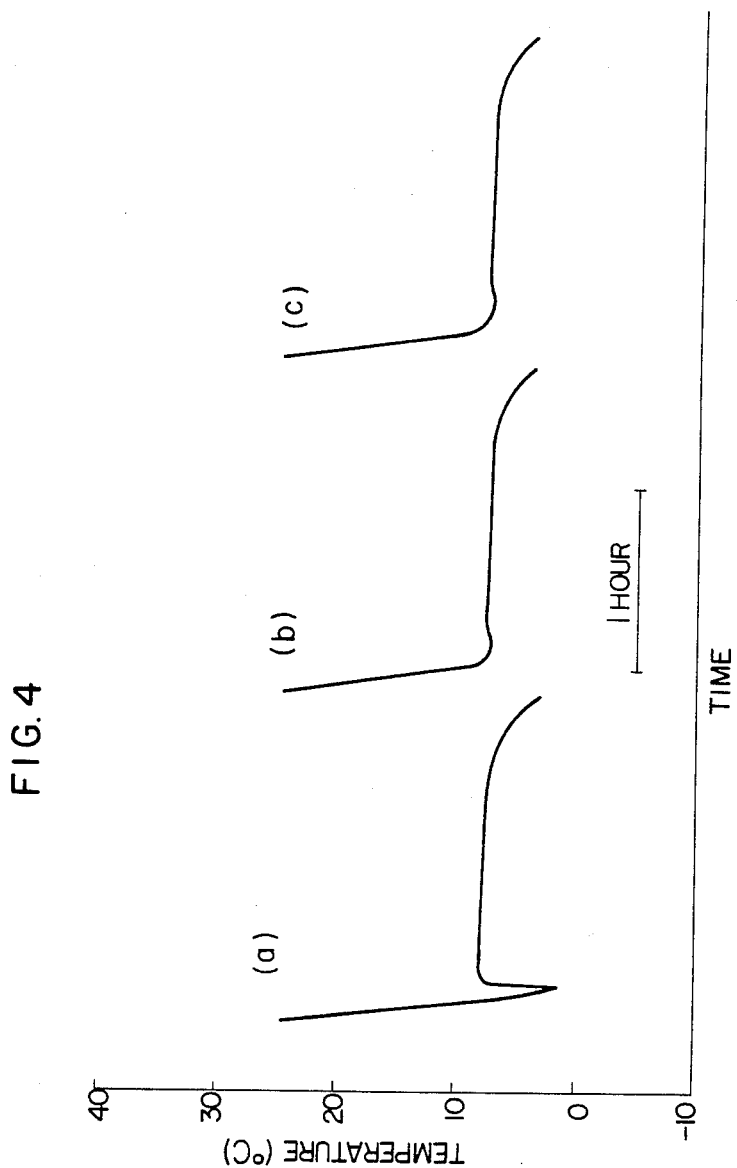

HEAT STORAGE MATERIAL

This invention relates to a heat storage material to be used for air cooling systems.

It is known that pure acetic acid solidifies or melts at 16.7° C. and in the case of acetic acid containing impurities, such as industrial grade acetic acid, its solidification or melting occurs at a fixed temperature above 14.5° C., which simultaneously causes release or absorption of latent heat, so that acetic acid is useful as a heat storage material. Acetic acid, however, has a disadvantageous property in that when placed in a sealed container it is subject to supercooling of an extent of 6°–10° C. with the result that its heat accumulation or release fails to take place at a fixed temperature. The cause of this phenomenon is not yet definitely known, but it is considered that this is due to the following reason: in case acetic acid is placed in an open container, evaporation of acetic acid takes place for the surface thereof, and as its evaporation heat is taken away, acetic acid separates out as crystals which serve as a nucleus for urging the progress of solidification.

A composition comprising acetic acid and an acetate dissolved therein also undergoes supercooling of 6° to 10° C. when placed in a closed state although no such supercooling occurrs in an open state as in the case of acetic acid, and hence these compositions, too, would fail to perform its heat accumulation or release at a fixed temperature when kept in a closed state.

An object of this invention is to prevent supercooling of acetic acid or composite materials of acetic acid and an acetate and to provide a heat storage material which is capable of smoothly effecting heat accumulation or heat release at a fixed temperature which is determined by the composition of the material.

The heat storage material according to this invention comprises acetic acid or a mixture of acetic acid and one or more acetates, and at least one substance selected from anhydrous halides of calcium, strontium, barium, potassium and ammonium as a nucleating agent.

In the accompanying drawings, FIG. 1 shows temperature-time curves as observed in cooling of pure acetic acid, wherein the curve (a) represents the case where no nucleating agent was added and the curve (b) the case where calcium chloride anhydride was added as nucleating agent.

FIG. 4 shows temperature-time curves as observed in cooling of acetic acid added with sodium acetate and potassium acetate, wherein the curve (a) represents the case where no nucleating agent was added, the curve (b) the case where potassium chloride was added as nucleating agent and the curve (c) the case where ammonium chloride was added as nucleating agent.

The anhydrous halides of calcium, strontium and barium usable as nucleating agent in this invention include chlorides, bromides or iodides of calcium, strontium and barium, and halides of potassium and ammonium also usable as nucleating agent in this invention include chlorides or bromides of potassium and ammonium.

Calcium chloride ($CaCl_2$) dissolves in acetic acid ($CH_3COOH$) to form $CaCl_2 \cdot 4CH_3COO$ (melting point: 73° C.) when left at a high temperature, but at a temperature close to the solidification point of acetic acid, calcium chloride is reduced in its solubility and separates out as crystals, and these crystals of calcium chloride act as a nucleating agent which urges crystal separating of acetic acid or acetic acid having one or more salts dissolved therein. Such nucleation is observed common to the anhydrous halides of calcium (Ca), strontium (Sr), barium (Ba), potassium (K) and ammonium ($NH_4$) as well.

Among these anhydrous halides, calcium chloride, anhydrous potassium chloride and ammonium chloride are found to have an especially high nucleating activity. Therefore, in the following description of the invention, there will be discussed the cases where calcium chloride, potassium chloride and ammonium chloride were used as nucleating agent.

Figure 1:
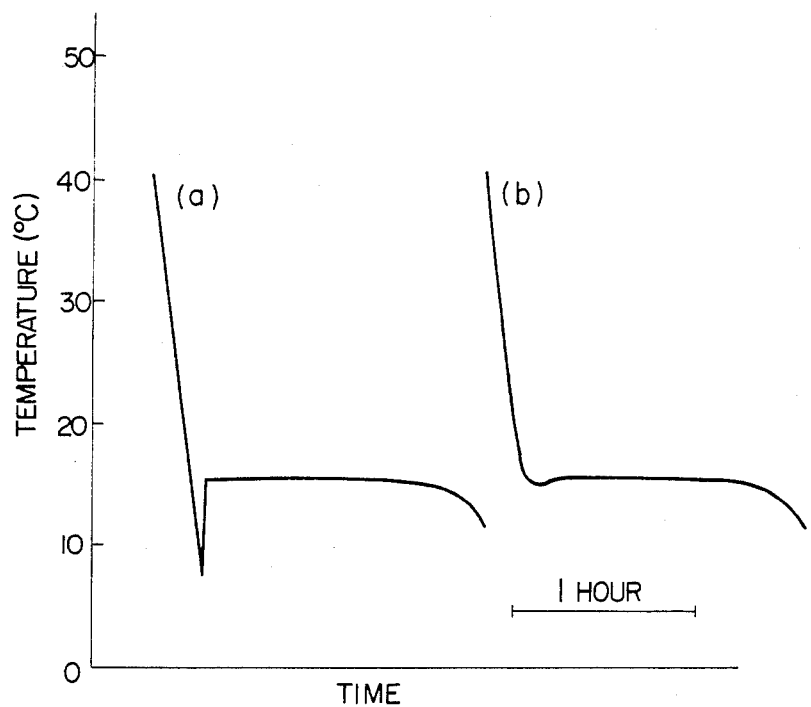

Referring to the accompanying drawings, FIG. 1 is a graph showing cooling curves (temperature versus time curves) of pure acetic acid (99.5% purity), wherein the curve (a) represents the case where no nucleating agent was added and the curve (b) the case where calcium chloride anhydride was added in an amount of 0.1% by weight as nucleating agent. It will be seen that in the case of curve (a), there takes place supercooling of 8° C. before commencement of solidification and solidification beings at 7.5° C., causing a corresponding rise of temperature till reaching 15.5° C., this temperature being maintained until solidification is completed. On the other hand, in the case of curve (b), supercooling before commencement of solidification is limited to 0.5° C., which is very small in comparison to the curve (a). In this case, too, the temperature rises with start of solidification and it remains at 15.5° C. until solidification is completed as in the case of curve (a).

Figure 2:
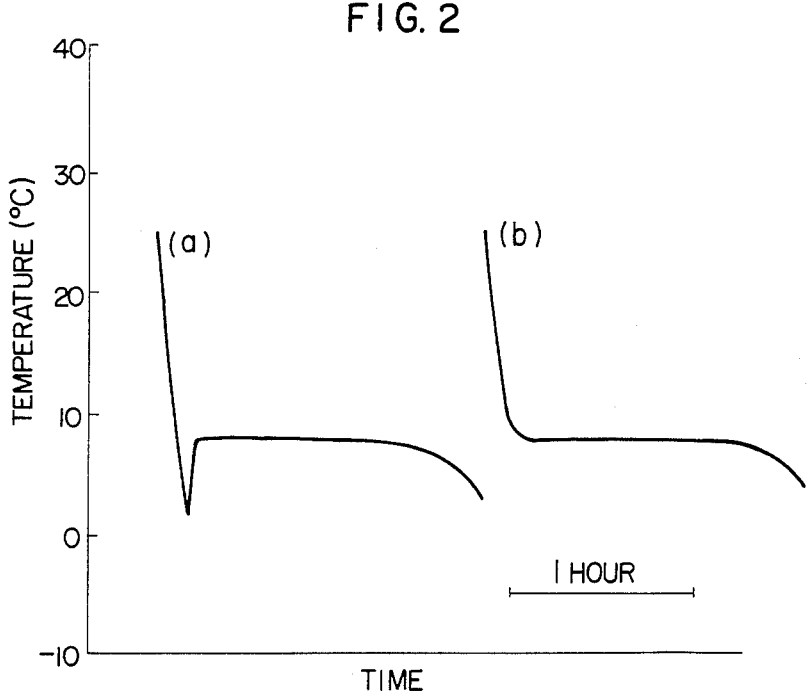
FIG. 2 shows temperature-time curves in cooling of a composition having sodium acetate and potassium acetate added to acetic acid, wherein the curve (a) represents a composition in which no nucleating agent was added and the curve (b) a composition in which calcium chloride anhydride was added as nucleating agent.

FIG. 2 shows cooling curves of the compositions having dissolved in acetic acid 5% by weight of sodium acetate and 5% by weight of potassium acetate, wherein the curve (a) represents the case where no nucleating agent was added and the curve (b) the case where calcium chloride anhydride was added in an amount of 0.1% by weight as nucleating agent. It will be noted that in the case of curve (a), 6° C. supercooling takes place before commencement of solidification and solidification begins at 1.5° C. with the temperature rising correspondingly till reaching 7.5° C. and maintained thereat until solidification is completed. In the case of curve (b), supercooling which occurs before commencement of solidification is limited to 0.3° C., far less than in the case of curve (a), and in this case, too, the temperature rises with start of solidification and is maintained at 7.5° C. until solidification is finished as in the case of curve (a).

Figure 3:
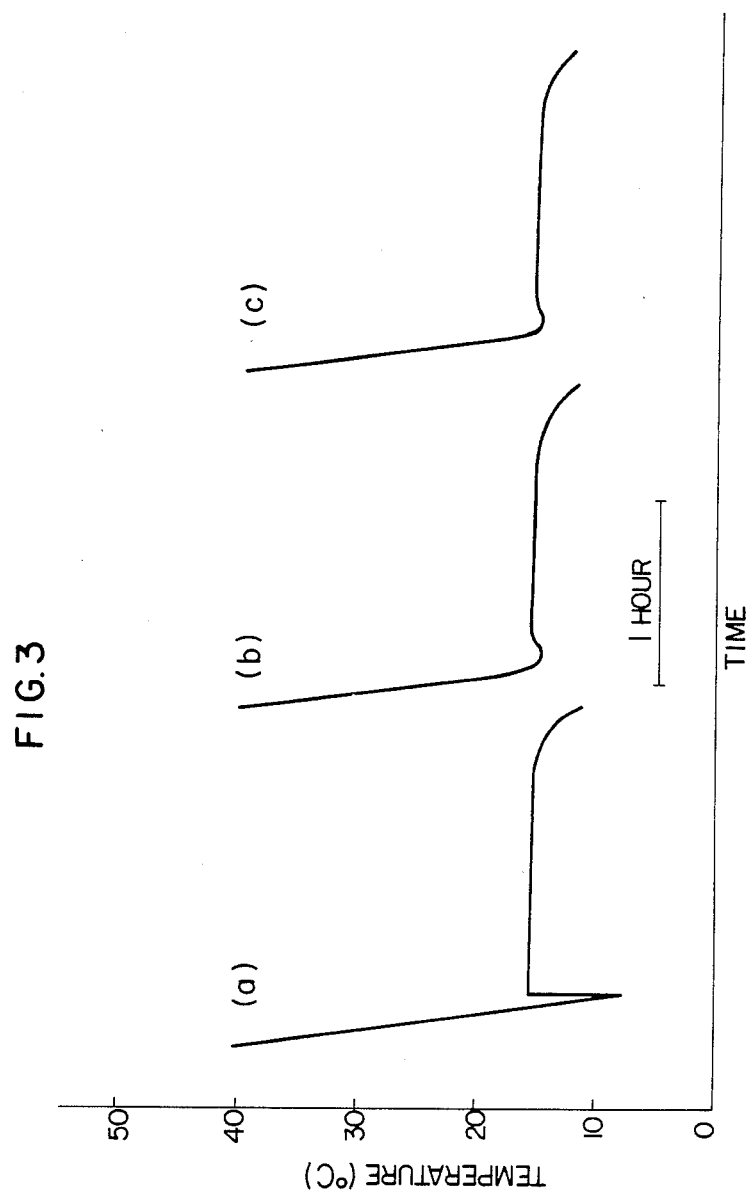
FIG. 3 shows temperature-time curves in cooling of pure acetic acid, wherein the curve (a) represents the case where no nucleating agent was added, the curve (b) the case where potassium chloride was added as nucleating agent and the curve (c) the case where ammonium chloride was added as nucleating agent.

FIG. 3 shows cooling curves of pure acetic acid (99.5% purity), with the curve (a) representing the case where no nucleating agent was added, the curve (b) the case where potassium chloride was added in an amount of 0.1% by weight as nucleating agent and the curve (c) the case where ammonium chloride was added in an amount of 0.1% by weight as nucleating agent. In the case of curve (a), solidification is preceded by supercooling of 8° C. and begins at 7.5° C., with the temperature rising accordingly till reaching 15.5° C. and maintained at this level until solidification is completed. On the other hand, in the cases of curves (b) and (c), supercooling occurring before start of solidification is limited to the degree of 1° C. and 0.5° C., respectively, which are very small in comparison to curve (a). In both of these cases, too, the temperature rises with commencement of solidification and is maintained at 15.5° C. throughout the course of solidification as in the case of curve (a).

FIG. 4 shows cooling curves of the compositions having dissolved in acetic acid 5% by weight of sodium acetate and 5% by weight of potassium acetate, wherein the curve (a) represents the case where no nucleating agent was added, the curve (b) the case where ammonium chloride was added and the curve (c) the case where potassium chloride was added, each in an amount of 0.1% by weight as nucleating agent. In the case of curve (a), supercooling of 6° C. takes place before commencement of solidification and thus solidification starts at 1.5° C. with corresponding rise of the temperature which reaches 7.5° C. and stays thereat until solidification is perfected. In the cases of curves (b) and (c), the degree of supercooling before start of solidification is 0.6° C. and 0.3° C., respectively, which are very limited in comparison to the case of curve (a). In both cases, the temperature rises with start of solidification and stays at 7.5° C. till perfection of solidification as in the case of curve (a).

The ratio of the nucleating agent to be added to acetic acid or to the composition of acetic acid and one or more acetates is preferably in the range of 0.005 to 10% by weight. Below 0.005% by weight, the desired effect of preventing supercooling (to less than about 1.5° C.) is not provided while use of the nucleating agent in excess of 10% by weight results in a reduced heat storage capacity.

The nucleating agent added in the heat storage material of this invention is slightly dissolved in acetic acid and will not form a compound with acetic acid. Therefore, the halides of calcium, barium, strontium, potassium and ammonium almost perfectly separate out when the heat storing medium is solidified, and hence the nucleating agent never loses its effect due to dissolution or a chemical change even if used repeatedly for a long time. Thus, the material of this invention maintains a stabilized nucleating effect over a long period of time in use.

The present invention will be further illustrated in detail hereinbelow by way of the following Examples.

EXAMPLE 1

A heat storage material was prepared by adding to industrial grade acetic acid (melting point: 15.0° C.) 0.01% by weight of calcium chloride anhydride as nucleating agent, and this heat storage material was subjected to 20 runs of repeated heating-cooling cycles, each cycle comprising heating to 40° C. and immediately cooling to 0° C., to record the temperature-time curve of this material.

Supercooling that took place in each run of said cycles was limited to less than 0.5° C., and the solidification temperature and the degree of supercooling remained perfectly unchanged throughout the repeated 20 runs of heating-cooling cycles. In the similar heating-cooling tests conducted on acetic acid with no nucleating agent added thereto, there took place supercooling of 8° to 10° C. in each run of cycle.

EXAMPLE 2

A heat storage material was prepared from a composition (solidification point: 8° C.) comprising industrial grade acetic acid added with 5% by weight of sodium acetate and 3% by weight of potassium acetate by further adding to said composition 0.01% by weight of calcium chloride anhydride as nucleating agent, and this heat storage material was subjected to repeated 20 runs of heating-cooling cycles (each cycle comprising heating to 25° C. and then cooling to −5° C.) while recording the temperature-time curve of this material. Supercooling that was observed in each run of cycle was less than 0.4° C., and there was seen no change of solidification temperature and the degree of supercooling throughout 20 times repetition of said heating-cooling cycles. In the simultaneously conducted heating-cooling tests on a material of the same acetic acid-acetate composition but with no nucleating agent added thereto, there occured supercooling of 5.5° to 6° C. in each run of cycle.

EXAMPLE 3

A heat storage material was made by adding to industrial grade acetic acid (melting point: 15.0° C.) 0.01% by weight of potassium chloride as nucleating agent, and this heat storage material was subjected to continuous 20 runs of heating (to 40° C.) and cooling (to 0° C.) cycles while recording the temperature-time curve of this material. Supercooling in each run of cycle was found suppressed to less than 1.0° C., and both solidification temperature and degree of supercooling remained perfectly unchanged after repeated 20 runs of said heating-cooling cycles. In the similar heating-cooling tests conducted on acetic acid with no nucleating agent added thereto, there was observed supercooling of 8° to 10° C. in each run of cycle.

EXAMPLE 4

The same test as in Example 3 was conducted on a heat storage material produced by adding to industrial acetic acid (m.p.: 15.0° C.) 0.01% by weight of ammonium chloride as nucleating agent. Supercooling in each run of heating-cooling cycles remained below 0.5° C., and there took place no change at all in both solidification temperature and degree of supercooling throughout 20 runs of repeated heating-cooling cycles.

EXAMPLE 5

A heat storage material prepared from a composition (solidification point: 8° C.) comprising industrial grade acetic acid added with 5% by weight of sodium acetate and 3% by weight of potassium acetate with further addition thereto of 0.01% by weight of potassium chloride as nucleating agent was subjected to continuous 20 runs of 25° C. heating and −5° C. cooling cycles by recording the temperature-time curve of this material. Supercooling in each run of said heatingcooling cycle was suppressed to less than 0.6° C., and both solidification temperature and degree of supercooling remained perfectly unchanged throughout said repeated 20 runs of heating-cooling cycles.

EXAMPLE 6

The same test as in Example 5 was conducted on a heat storage material prepared from a composition (solidification point: 8° C.) comprising industrial grade acetic acid added with 5% by weight of sodium acetate and 3% by weight of potassium acetate by further adding thereto 0.01% by weight of ammonium chloride as nucleating agent. Supercooling in each run of said heatingcooling cycles was less than 0.3° C., and absolutely no change of solidification temperature and degree of supercooling was seen throughout the whole 20 runs of said heating-cooling cycles.

As described above, the heat storage material according to this invention is capable of suppressing supercooling to a degree below 1.5° C. owing to the addition of an anhydrous halide of calcium, strontium, barium, potassium and/or ammonium as nucleating agent to acetic acid or a composition comprising acetic acid added with acetates, and this made possible effective utilization of the latent heat released from the material when it is solidified.

What is claimed is:

1. A heat storage material consisting essentially of pure or industrial grade acetic acid or a mixture of pure or industrial grade acetic acid and one or more acetates, and at least one anhydrous halide of a substance selected from the group consisting of calcium, strontium, barium, potassium and ammonium as a nucleating agent; the amount of the anhydrous halide in the heat storage material being 0.005 to 10% by weight.

2. A heat storage material according to claim 1, wherein the anhydrous halide is a chloride of calcium, strontium, barium, potassium or ammonium.

3. A heat storage material according to claim 1, wherein the anhydrous halide is a bromide of calcium, strontium, barium, potassium or ammonium.

4. A heat storage material comprising acetic acid or a mixture of acetic acid and one or more acetates, and at least one anhydrous iodide of calcium, strontium or barium.

5. A heat storage material comprising pure or industrial grade acetic acid or a mixture of pure or industrial grade acetic acid and one or more acetates, and two or more anhydrous halides of the substances selected from the group consisting of calcium strontium, barium, potassium and ammonium.

6. A heat storage material according to claim 5, wherein the anhydrous halides are chlorides of calcium, strontium, barium, potassium and/or ammonium.

7. A heat storage material according to claim 5, wherein the anhydrous halides are bromides of calcium, strontium, barium, potassium and/or ammonium.

8. A heat storage material according to claim 5, wherein the anydrous halides are iodides of calcium, strontium and/or barium.

9. A heat storage material according to claim 5, wherein the amount of the anhydrous halides added in the heat storage material is 0.005 to 10% by weight.

10. A heat storage material according to claim 1, wherein said mixture of pure or industrial grade acetic acid and one or more acetates is composed predominantly of pure or industrial grade acetic acid.

11. A heat storage material comprising pure or industrial grade acetic acid or a mixture of pure or industrial grade acetic acid and one or more acetates, and at least one anhydrous halide of a substance selected from the group consisting of calcium, strontium and barium, or at least one anhydrous chloride or bromide of ammonium, or mixtures thereof; the amount of the anhydrous halide in the heat storage material being 0.005 to 10% by weight.

* * * * *